United States Patent [19]

Krause et al.

[11] Patent Number: 4,703,419

[45] Date of Patent: Oct. 27, 1987

[54] SWITCHCOVER MEANS AND METHOD FOR DUAL MODE MICROPROCESSOR SYSTEM

[75] Inventors: Charles A. Krause, Stevensville; Babu Rajaram, St. Joseph; Barry A. Watzman, Benton Harbor, all of Mich.

[73] Assignee: Zenith Electronics Corporation, Glenview, Ill.

[21] Appl. No.: 886,956

[22] Filed: Jul. 24, 1986

Related U.S. Application Data

[63] Continuation of Ser. No. 444,758, Nov. 26, 1982, abandoned.

[51] Int. Cl.⁴ ............................................. G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,287,705 | 11/1966 | Rosenblatt et al. | 364/200 |
| 3,665,404 | 5/1972 | Werner | 364/200 |
| 3,676,861 | 7/1972 | Ruth | 364/200 |
| 3,812,463 | 5/1974 | Lahti et al. | 364/200 |
| 3,895,353 | 7/1975 | Dalton | 364/200 |
| 4,001,783 | 1/1977 | Monahan et al. | 364/200 |
| 4,077,060 | 2/1978 | Bodner et al. | 364/200 |
| 4,271,468 | 6/1981 | Christensen et al. | 364/200 |
| 4,306,288 | 12/1981 | Nakamura | 364/200 |
| 4,318,174 | 3/1982 | Suzuki et al. | 364/200 |
| 4,400,775 | 8/1983 | Nozaki et al. | 364/200 |
| 4,420,806 | 12/1983 | Johnson, Jr. et al. | 364/200 |

OTHER PUBLICATIONS

Drimak, E. G. "Multiprocessor Input/Output Interrupt Mechanism", IBM Technical Disclosure Bulletin, vol. 19, No. 1, Jun. 1976, pp. 48-50.
68000-Based System Features CP/M Capabilities, Jerry Miller C.M. Technologies Inc., pp. 133-136.

Primary Examiner—Gareth D. Shaw
Assistant Examiner—Kevin A. Kriess

[57] ABSTRACT

In a dual microprocessor system, a processor transfer, or swap, arrangement and method therefor are disclosed for transferring control from one processor to another. The present invention involves the temporary suspension of operation of a first microprocessor which relinquishes system control and the initiation of operation of a second microprocessor which may begin operation either where it last left off or may execute a new operating routine in accordance with instructions provided by the first microprocessor. Provision is made for automatically handing over system control to the second microprocessor upon the occurrence of an interrupt. In addition, the microprocessor not exercising system control is rendered unresponsive to the occurrence of a program interrupt allowing it to continue opration unaffected by the program interrupt following its reactivation.

7 Claims, 4 Drawing Figures

SWITCHCOVER MEANS AND METHOD FOR DUAL MODE MICROPROCESSOR SYSTEM

This is a continuation of application Ser. No. 444,758, filed Nov 26, 1982, now abandoned.

BACKGROUND OF THE INVENTION

This invention generally relates to dual processor data handling systems and more specifically is directed to improved means and method for switching system control from one microprocessor to another in a dual processor data processing system.

Interrupt routines are generally utilized in microcomputers and microprocessors to coordinate several kinds of asynchronous events. An interrupt initiates a subroutine call in response to some external condition (the actual interrupt) which provides a predetermined control input to the microcomputer's central processing unit (CPU) chip. This initiates execution of a specific subroutine located at a predetermined address and results in the suspension of the program being executed at the time of interrupt occurrence. The specific subroutine executed in response to external stimuli is called the interrupt service routine. These external stimuli may be the result of such events as a keyboard entry, high speed printer operation, or the presentation of data on a video display.

Typically an interrupt latch senses and holds some external event that wants to communicate with the CPU's processor. The latch "stores" the interrupt in cases where the CPU cannot immediately respond, such as where the CPU is servicing an immediately preceding interrupt. When the CPU acknowledges the interrupt, it also clears the interrupt latch.

In prior art systems when the interrupt program finishes, the last instruction in it must cause the interrupted program to resume exactly where it left off. Thus, the program typically provides some means to first save and then later restore all registers and status bits so as not to degrade the interrupted program's data. Some systems perform this function automatically, while others make the interrupt service routine responsible for maintaining continuity for the interrupted program. Most of these processors use a register stack. As heretofore described, the interrupt function is used with respect to one processor, or microprocessor in a microcomputer, for performing the aforementioned functions.

Multiprocessor systems are becoming increasingly popular because of the advantages inherent in this approach. For example, a low performance microprocessor which may be generally available and for which a large amount of machine language as well as high level language software is available may be combined with a more powerful microprocessor for performing more sophisticated, specifically tailored tasks. Or perhaps a larger memory or higher operating speeds are occasionally required, for which a more sophisticated microprocessor would be particularly adapted while for the more common, simpler operations a cheaper, more easily programmed microprocessor could be utilized. System reliability is another consideration in a multiprocessor system where one or more processors may be used as a back-up unit for the operating microprocessor. A common approach to the multiprocessor concept involves a dual processor arrangement in which only one microprocessor is active at one time with system control alternately switched between the two microprocessors.

In transferring control from a first microprocessor to a second microprocessor in a dual processor system, the prior art procedure generally involves the first microprocessor suspending its operation and relinquishing control of the data bus. The second microprocessor then goes on-line and begins executing a selected routine in its memory. This involves the interleaving of the respective codes of the first and second microprocessors. When control is returned to the first microprocessor, its operation is resumed where it had earlier terminated in response to the interrupt request. No provision is made for initiating a new routine in the first microprocessor in response to the routine carried out in the second microprocessor. This results in a substantial limitation in the operating flexibility of dual microprocessor systems.

An example of a data processing system with a plurality of processors is provided in U.S. Pat. No. 4,306,288 to Nakamura wherein a multiprocessor initialization sequence provides diagnostic routines in each processor and connects an individual processor in the system only if the results of the diagnostic routines indicate no failures therein. The diagnostic routine for a given processor is initiated in response to either a host selection signal or a subprocessor selection signal. If a failure is detected in the diagnostic routine in the host processor, the failure is registered and sent to all subprocessors resulting in the failed subprocessor being excluded from the system. Another multiprocessor system is described in an article in the October, 1981 issue of "Mini-Micro Systems" entitled "68000-Based System Features CP/M Capabilities", at page 133. The system described therein provides for the integration of the Zilog Z80 and the Motorola 68000 microprocessors under the control of a Digital Equipment Corporation PDP-11.

The present invention is intended to provide an improved means for transferring system control in a dual microprocessor system from one processor to another using currently available processor operating features. The present invention is equally applicable to a system utilizing more than two microprocessors where only one processor is operating at a given time.

OBJECTS OF THE INVENTION

Accordingly, it is an object of the present invention to provide for the automatic transfer of control in a dual processor system to a selected microprocessor in the event of the occurrence of an interrupt service routine.

Another object of the present invention is to facilitate transfer of control of a central processing unit from one microprocessor to another microprocessor using a readily available microprocessor operating mode.

Still another object of the present invention is to provide a dual processor microcomputer system having a large readily available software base and which is easily expendable in computational power for performing unique, specialized computations.

A further object of the present invention is to facilitate the transfer of control between two or more microprocessors in a multiprocessor data handling system where only one processor is in operation at a given time.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
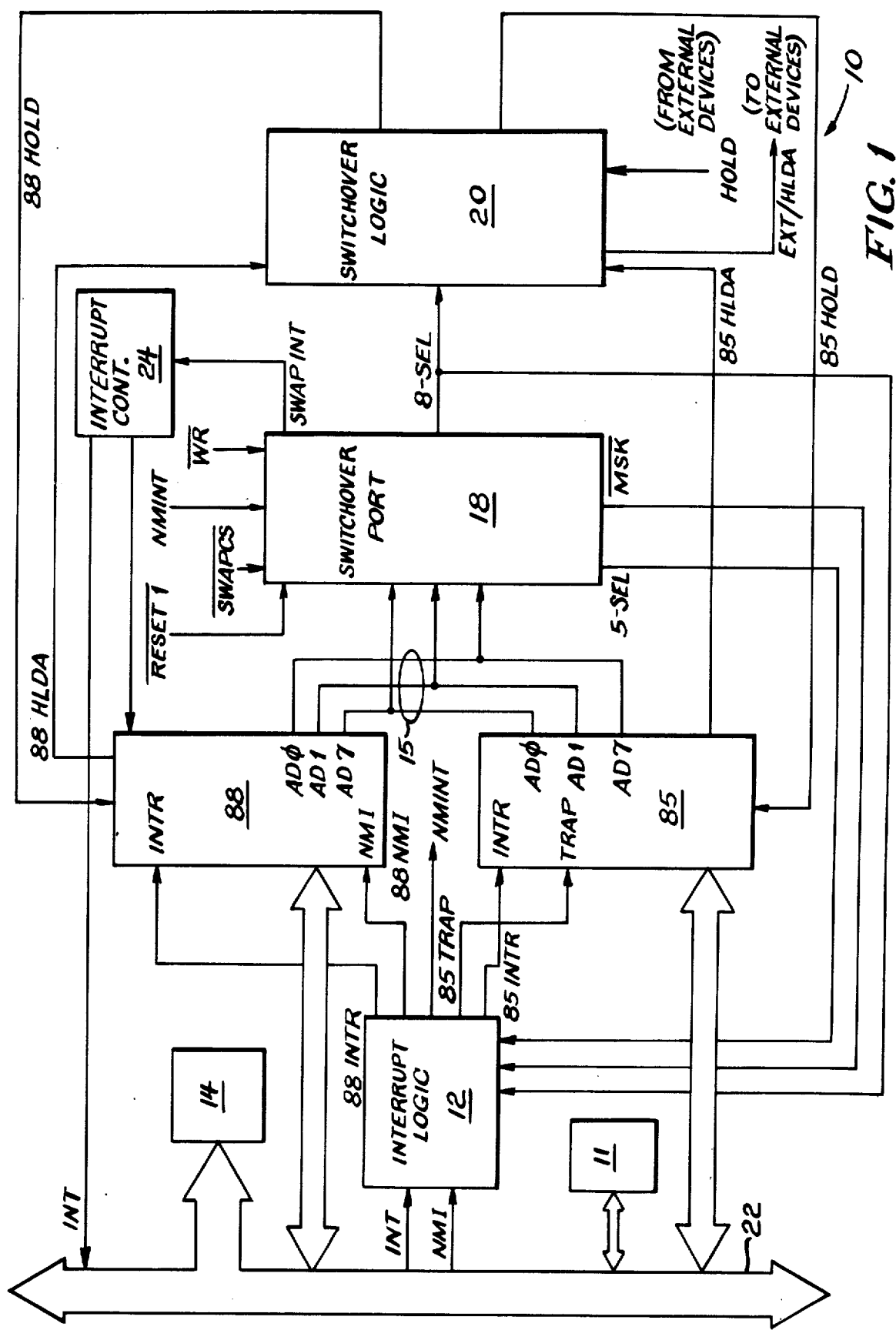
FIG. 1 shows a simplified block diagram of a dual mode microprocessor switchover system in accordance with the present invention.

Referring to FIG. 1, there is shown in block diagram form a switchover means for a dual processor system 10 in accordance with the present invention.

The system includes a bi-directional bus 22 communicating with an input/output device 14 and a common memory 11 for the transport of control, data and/or address information therebetween. Although input/output device 14 is represented as a single block, many input/output devices, such as a printer, a video display, a keyboard, etc., could as easily be coupled to bus 22 for operation with the present invention. These input/output devices, or peripherals as they are sometimes referred to, typically include or have associated therewith an adapter, or interface, unit (not shown in FIG. 1) which provides for interface control of data transfers between the bus 22 and the input/output device, or devices, 14. The system also includes a common, or main, memory unit 11 in communication with the bus 22 in which the general system program is stored and wherein system operating parameters are temporarily stored for later recall. The system further includes microprocessors 85, 88 coupled to the bus 22 and to which interrupt control signals are provided by means of interrupt logic circuit 12. In accordance with the operating program, microprocessors 85, 88 selectively write to switchover port 18 via bits AD0, AD1 and AD7. After being processed in switchover port 18 in a manner described in detail below, these control signals are then provided to switchover logic circuitry 20. The switchover logic circuitry 20 in response to the input control signals provided thereto, provides appropriate control signals to microprocessors 85, 88 for transferring control of the system to either microprocessor 85 or microprocessor 88 in response to inputs from the switchover, or swap, port 18.

Figure 2:
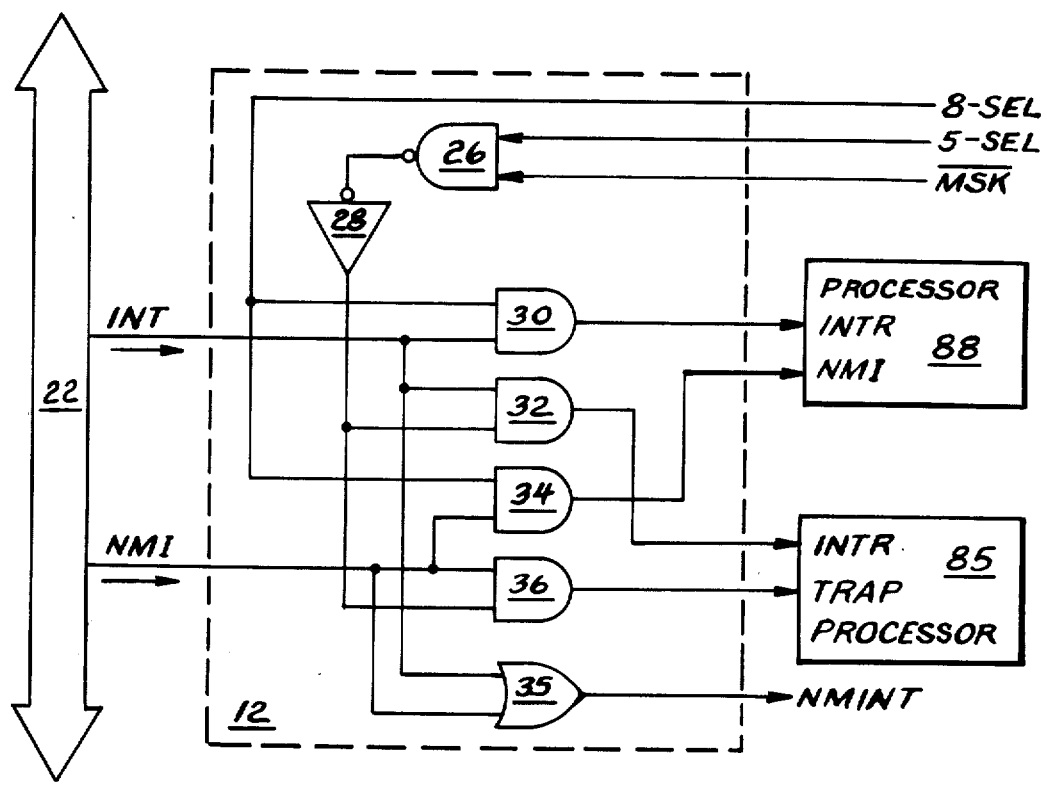
FIG. 2 shows the interrupt signal processing utilized in providing interrupt signals to the microprocessors in the system of FIG. 1.

More specifically, referring to FIG. 2, an Interrupt signal (INT) and a Nonmaskable Interrupt signal (NMI) are provided to interrupt logic circuit 12. These interrupt signals may be generated for any number of reasons such as in response to the operation of a peripheral device or in accordance with execution of the operating program. The INT and NMI signals are provided by the system's bus 22 and respectively represent interrupt signals which can and cannot be ignored by a microprocessor by virtue of its internally stored software program. An example of a Nonmaskable Interrupt might be a system power failure since it would likely be desirable to transfer stored data to a nonvolatile memory in the event of a loss of power.

Three additional inputs are provided to the interrupt logic circuit 12 from the switchover port 18. These three signals, or bits of information, are generated in the switchover port 18 in a manner described below and respectively represent selection of microprocessor 85 for executing system control (5 SEL), selection of microprocessor 88 for executing system control (8 SEL), and the interrupt mask control bit ($\overline{MSK}$). Interrupt control circuit 12 processes the aforementioned two interrupt control inputs from bus 22 and three microprocessor select control inputs from the switchover port 18 and provides control signals to the two microprocessors to ensure that only the operating microprocessor is responsive to an interrupt signal. With the nonoperating microprocessor unresponsive to an interrupt signal, this processor may upon resumption of operation respond to a control input directing it to initiate an operation other than that of the prior interrupt.

The interrupt logic circuit 12 includes a NAND gate 26, an inverter 28 and a plurality of AND gates 30, 32, 34 and 36. An interrupt signal is provided from bus 22 to one input of each of AND gates 30, 32. Similarly, the Nonmaskable Interrupt signal is provided to one input of each of AND gates 34, 36. To the other input of AND gates 30, 34 is provided the 8 SEL signal such that the Maskable Interrupt (INTR) pin of microprocessor 88 is set when the 8 SEL and Interrupt signals are high, and the INTR pin of microprocessor 88 is reset if either of the aforementioned inputs to AND gates 30, 34 is low. Similarly, if the 8 SEL and the NMI signals provided to AND gate 34 are high, the Nonmaskable Interrupt (NMI) pin of microprocessor 88 is set. If either, or both, of these inputs to AND gate 34 goes low, the NMI pin of microprocessor 88 is reset. Therefore, in order for microprocessor 88 to be responsive to an interrupt control signal the 8 SEL bit must be high indicating that microprocessor 88 is exercising control over system operation. Consequently, if the 8 SEL bit is low, as in the case where microprocessor 88 is inoperative, microprocessor 88 will be unresponsive to an interrupt request upon its subsequent reactivation.

The 5 SEL and $\overline{MSK}$ outputs of switchover port 18 are provided to NAND gate 26, the output of which is provided to inverter 28. Inverter 28 will only provide an output when both the 5 SEL and $\overline{MSK}$ inputs to NAND gate 26 are 1, or in a high state. The output of inverter 28 is coupled to one input of each of AND gates 32, 36 as are the Interrupt and the Nonmaskable Interrupt signals, respectively. If either the 5 SEL or $\overline{MSK}$ inputs to the interrupt logic circuit 12 are low, then both INTR and TRAP of microprocessor 85 will be reset. Similarly, if the 5 SEL and $\overline{MSK}$ signals are high, and one of the INT or NMI signals is high, the corresponding outputs of NAND gates 32 or 36 will be high with the corresponding input pin, INTR or TRAP, of microprocessor 85 being active. Since the 8 SEL and 5 SEL signals are complements of one another, as will be explained below with respect to the operation of switchover port 18, it can be seen that a respective 8 SEL or 5 SEL signal must be high before system control will be handed over to microprocessor 88 or microprocessor 85. The INT signal and the NMI signal from the system bus 22 are OR'ed together in OR gate 35 such that the NMINT signal is output therefrom if either of these input signals are active.

Figure 3:
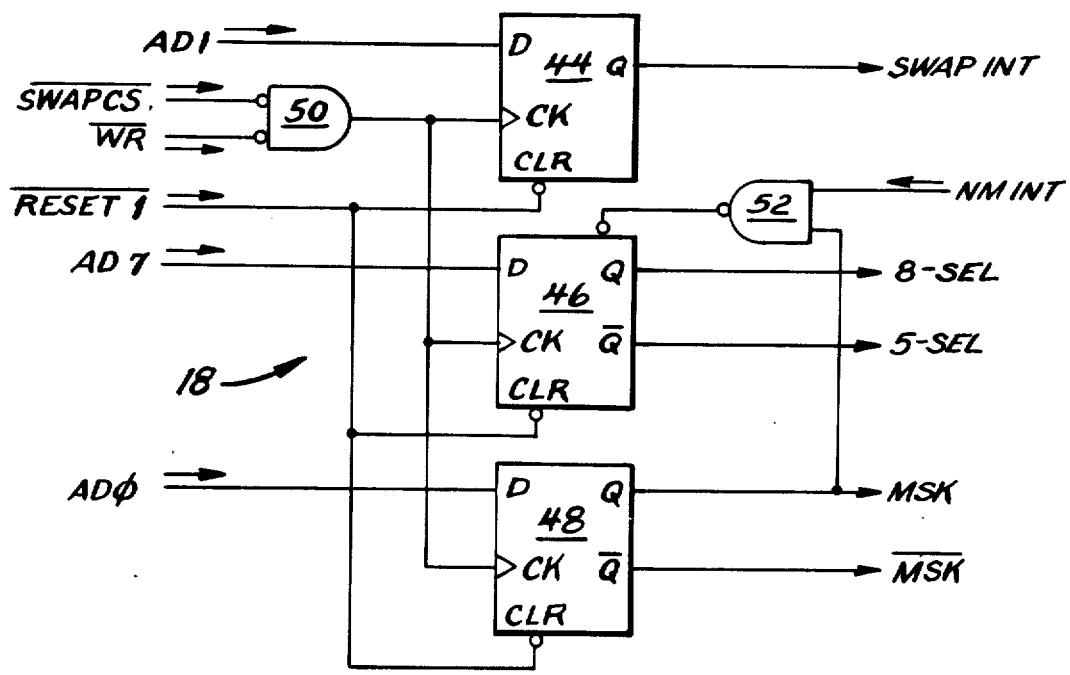
FIG. 3 shows the logic organization of a switchover port utilized in the system of FIG. 1.

In addition, the MSK output from flip-flop 48 and a NMINT output from the bus 22 are provided to NAND gate 52 in the switchover port 18 as shown in FIG. 3. The NMINT bit represents the combination of a maskable and a nonmaskable interrupt and indicates the occurrence but not the type of an interrupt. When the MSK and NMINT bits are high a low output is provided by NAND gate 52 to the set pin of flip-flop 46 for the presetting thereof, resulting in a high 8 SEL output therefrom. Thus, microprocessor 88 will assume system control upon the occurrence of either type of interrupt. If either or both of the MSK and NMINT bits are low, the 5 SEL output from flip-flop 46 will be high causing microprocessor 85 to assume system control following an interrupt.

In addition, if the MSK bit is set, i.e., the $\overline{MSK}$ input to NAND gate 26 is low, system control will automatically be transferred to microprocessor 88 in the event of an interrupt request. Finally, with system control transferred to one of the microprocessors in accordance with processing of the various control inputs just described, either the Maskable or Nonmaskable Interrupt pin of the microprocessor thus selected will be placed in a high state depending upon whether an INT or NMI control signal is provided by bus 22 to one of the aforementioned AND gates of interrupt logic circuit 12. With the desired microprocessor and mask bit therein thus selected, the Interrupt request is serviced by that microprocessor in accordance with the operating characteristics of the microprocessor thus selected. In addition, microprocessor 85 will be unresponsive to either an INT or NMI control signal from bus 22 if the 5 SEL signal is low such as occurs when microprocessor 85 is inoperative.

The organization and operation of interrupt logic circuit 12 is such that microprocessor 85 may only assume system control following an interrupt if the 5 SEL and MSK signals are high. If the $\overline{MSK}$ signal is low indicating that the mask bit is set, microprocessor 85 will be transparent to an interrupt service routine even if in operation when the interrupt occurs. If the 5 SEL, $\overline{MSK}$, and INT inputs to the interrupt logic circuit 12 are high, an input signal will be provided to the INTR port of microprocessor 85 and microprocessor 85 will handle the interrupt service routine and assume control of the system. If the 5 SEL, $\overline{MSK}$, and NMI inputs to the interrupt logic circuit 12 are high, the TRAP bit of microprocessor 85 will be set for execution of a nonmaskable Restart interrupt which is unaffected by any mask or interrupt enable command in microprocessor 85.

Referring to FIG. 3, it can be seen that switchover port 18 is comprised of three D-type flip-flops 44, 46 and 48 and two NAND gates 50, 52. The three flip-flops in the switchover port 18 act as a 3-bit register with clocking signals provided thereto by means of NAND gate 50. $\overline{SWAPCS}$ in combination with the $\overline{WR}$ input to NAND gate 50 indicate that a processor is writing to the swap port 18 with the content of what is being written determined by the state of the AD0, AD1 and AD7 bits from that processor. When both of these inputs to NAND gate 50 are low, its output goes high and is provided to the clock inputs of each of flip-flops 44, 46 and 48 for the clocking of data into the flip-flops. The AD1 input to flip-flop 44 from a microprocessor controls the SWAPINT bit. When the AD1 bit is high, the SWAPINT output from flip-flop 44 is high and is provided to an interrupt controller 24. In a preferred embodiment, interrupt controller 24 is a programmable device having a plurality of addressable locations wherein are stored vector pointers to various interrupt service routines. Such devices are well known in the art and may be appropriately programmed by one skilled in the art of microcomputer/microprocessor programming to accommodate various peripheral devices and those operations typically associated therewith. In response to a SWAPINT input provided thereto, the interrupt controller 24 generates an INT (interrupt) signal and provides this signal to the system bus 22, which signal is then processed by the aforementioned interrupt logic circuit 12 in a manner previously described causing the microprocessor which is about to begin operation to be interrupted and to jump to a desired routine. This permits the microprocessor which is about to be brought on line to start a new operation and not simply continue where it left off when it lost system control.

The AD7 and AD0 outputs from a microprocessor are provided respectively to flip-flops 46 and 48. The AD7 bit represents the microprocessor select bit for designating the microprocessor to assume system control. The AD0 bit controls or sets the MSK bit high or low. If the MSK bit is set in response to a high AD0 input to flip-flop 48, microprocessor 88 will assume system control following an interrupt even if microprocessor 85 is operating. A high AD7 input to flip-flop 46 produces a high 8 SEL output therefrom. When the AD7 bit is reset, a 5 SEL output, which is the complement of the 8 SEL bit, will be provided by flip-flop 46 to the interrupt logic circuit 12. A $\overline{RESET \; 1}$ signal is provided to each of the reset pins of flip-flops 44, 46 and 48 for clearing each of these elements in the resetting thereof.

Figure 4:
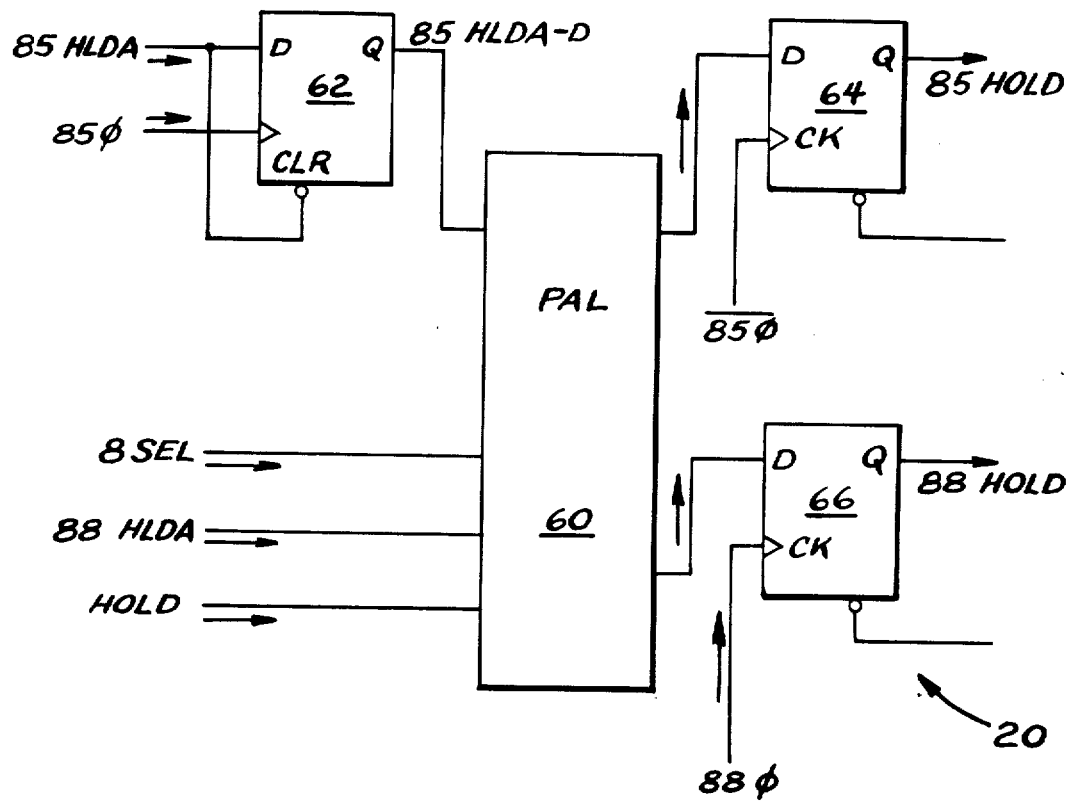
FIG. 4 shows the switchover logic used in the system of FIG. 1 to generate the control signals for microprocessor switchover operation.

The 8 SEL signal provided to the switchover logic circuit 20, shown in detail in FIG. 4, indicates which microprocessor should be in operation. The 8 SEL signal is also provided to the interrupt logic circuit 12 for controlling the operation thereof as previously described. The microprocessor which is not in operation provides a Hold Acknowledge (HLDA) signal to the switchover logic 20 for insuring that the microprocessor previously in operation is shut down prior to activation of the other microprocessor. Thus, both microprocessors will be inoperative for a short period during the processor swap and then system control is transferred to the other microprocessor. A HOLD signal is also provided from the bus 22 to the switchover logic circuit 20 representing a request that bus control be transferred to any external device seeking to take control of the bus. In response to these inputs, the switchover logic circuit 20 provides either an 85 HOLD or 88 HOLD signal to either microprocessor 85 or microprocessor 88, respectively. These respective hold signals cause the microprocessor to which they are transmitted to relinquish bus control in response to a request for transfer of control provided to switchover logic circuit 20 via the HOLD signal provided thereto. A HOLD request may, in fact, originate in the microprocessor to which it is provided if system operation dictates that it relinquish control. A HOLD signal provided to a microprocessor results in the shutdown of that microprocessor permitting system control to be transferred to another microprocessor.

After both microprocessors have been deactivated, one of the HOLD outputs from the switchover logic circuit 20 goes low, turning on the microprocessor to which system control is to be transferred. Thus, system control is transferred from one microprocessor to another to execute a particular routine by the second processor in response to the SWAPINT control bit provided by the first processor. In a preferred embodiment of the present invention, microprocessor 88 is an 8088 microprocessor which is an external 8-bit and an internal 16-bit microprocessor available from Intel Corporation of Santa Clara, Calif. Microprocessor 85 in a preferred embodiment is the 8085 8-bit microprocessor also available from Intel Corporation of Santa Clara, Calif.

Referring to FIG. 4, more specifically, switchover logic 20 includes three D-type flip-flops 62, 64 and 66 in combination with a programmable array logic (PAL) circuit 60. The PAL circuit 60 is conventional in nature and programmable as desired by blowing fusible links to configure AND and OR gates (not shown) to perform desired logic functions. In a preferred embodiment, a PAL Series 20 integrated circuit available from Monolithic Memories of Sunnyvale, Calif., is utilized in the switchover logic circuit 20.

8 SEL, 88 HLDA, HOLD and 85 HLDA-D (hold acknowledge delayed) inputs are provided to PAL circuit 60. A high 8 SEL input indicates that system control is to be transferred to microprocessor 88. In addition, an 85 HLDA signal is provided via flip-flop 62 to PAL circuit 60. Flip-flop 62, which receives a clock input 85 from microprocessor 85, provides proper timing for the 85 HLDA input to PAL circuit 60. The 85 HLDA-D input to PAL circuit 60 indicates that microprocessor 85 has been put on hold and has relinquished bus control. A high 88 HLDA input indicates that microprocessor 88 has been put on hold and has relinquished bus control. The HOLD input provided thereto from bus 22 indicates that bus control is sought by an external device, which may be another microprocessor.

In response to these various inputs, PAL circuit 60 provides an output to either flip-flop 64 or flip-flop 66 for generating either an 85 HOLD or an 88 HOLD in initiating the transfer of bus control. If the 8 SEL input is high, control is to be transferred to microprocessor 88. A high 88 HLDA input indicates that microprocessor 88 has relinquished data bus control which may then be transferred to microprocessor 85. Similarly, a high 85 HLDA input indicates that microprocessor 85 has relinquished data bus control in response to a high 8 SEL input causing an 85 HOLD output to be provided by flip-flop 64 to microprocessor 85. A HOLD input provided to PAL circuit 60 will cause 85 and 88 HOLD signals to be respectively provided to microprocessors 85 and 88 in initiating bus control transfer to an external device. Timing inputs 85φ and 88φ are provided to the respective clock inputs of flip-flops 85 and 88 for ensuring proper timing of the HOLD signal provided to a respective microprocessor.

There has thus been shown a system and method for transferring bus control in a dual processor system from a first operating processor to a second inactive processor. The second processor may begin operation either where it left off when it last relinquished control or may be directed to execution of a new routine in response to control inputs from the first processor. In addition, provision is made for automatically handing over system control to the second microprocessor upon the occurence of an interrupt in the system.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a multiprocessor data handling system including an input/output device, a common memory unit and a bus coupled to said common memory unit and said input/output device, wherein system control is exercised successively by each of a plurality of processors, an arrangement for alternately transferring control of said system between processors therein comprising:
   a first operating processor coupled to said bus and exercising control over said system and having a first program stored therein for transferring program status data and instructions between said common memory unit and said first processor;
   a second idle processor coupled to said bus and having a second program stored therein for transferring program status data and instructions between said common memory unit and said second processor;
   first means coupled to said bus and to said first operating and second idle processors and responsive to an interrupt signal from said input/output device for generating a processor select signal;
   interrupt blanking means within said first means coupled to said second idle processor for rendering said second idle processor insensitive to an interrupt signal from said bus;
   second means coupled to said processors and to the bus and responsive to said select signal for generating a swap interrupt signal and a first operate signal in response thereto and providing said first operate signal to said second idle processor in initiating operation of said second idle processor;
   a programmable interrupt controller coupled to said second means and responsive to said swap interrupt signal for providing a second address-coded operate signal to the bus and thence to said second processor via said first means for initiating the operation of said second processor at a desired location in the second program stored therein; and
   third means coupled to said first and second processors and to said bus and said second means and responsive to a hold signal and said first operate signal respectively output by said bus and by said second means for providing said hold signal to said first operating processor in rendering said first operating processor in an idle condition prior to initiation of operation of said second idle processor.

2. An arrangement in accordance with claim 1 wherein said second and third means include nonmaskable interrupt signal detection means for detecting a nonmaskable interrupt signal provided by said input/output device for automatically transferring system control to said first processor in response thereto.

3. An arrangement in accordance with claim 1 wherein said second means includes decoding detection means for detecting when address information is being provided by said bus for generating a decoding signal and providing said decoding signal to said first processor for initiating a transfer of said address information thereto.

4. An arrangement in accordance with claim 1 wherein said first and second means include interrupt signal detection means responsive to an interrupt signal from said bus for automatically transferring system control to said first processor when an interrupt signal is provided by said input/output device.

5. An arrangement in accordance with claim 1 wherein a hold acknowledge signal is provided by said first processor to said third means prior to the providing of said first operate signal to said second processor to ensure that said first processor is in an idle condition prior to the initiation of operation of said second processor.

6. An arrangement in accordance with claim 1 wherein said first processor processes m-bit data words and said second processor processes n-bit data words where $m \neq n$.

7. An arrangement in accordance with claim 6 wherein said first processor is a 16-bit microprocessor and said second processor is an 8-bit microprocessor.

* * * * *